FIG. 1

INVENTOR.
WILLIAM G. H. FINCH
ATTORNEY.

INVENTOR.
WILLIAM G. H. FINCH
BY
ATTORNEY.

March 2, 1943.　　W. G. H. FINCH　　2,312,328
DUPLEX SYSTEM
Filed July 12, 1940　　9 Sheets-Sheet 5

INVENTOR.
WILLIAM G. H. FINCH
BY
ATTORNEY.

March 2, 1943.    W. G. H. FINCH    2,312,328
DUPLEX SYSTEM.
Filed July 12, 1940    9 Sheets-Sheet 6

INVENTOR.
WILLIAM G. H. FINCH
BY
ATTORNEY.

INVENTOR.
WILLIAM G. H. FINCH
BY
ATTORNEY.

March 2, 1943.  W. G. H. FINCH  2,312,328
DUPLEX SYSTEM
Filed July 12, 1940  9 Sheets-Sheet 8

INVENTOR.
WILLIAM G. H. FINCH
BY
ATTORNEY.

INVENTOR.
WILLIAM G. H. FINCH
BY

ATTORNEY.

Patented Mar. 2, 1943

2,312,328

UNITED STATES PATENT OFFICE 2,312,328

DUPLEX SYSTEM

William G. H. Finch, Newtown, Conn.

Application July 12, 1940, Serial No. 345,194

5 Claims. (Cl. 178—6.6)

My invention relates in general to the field of facsimile transmission and reception and more specifically relates to a facsimile unit in which the same general mechanism may be employed for both transmission and reception.

In facsimile transmission systems it is necessary to secure synchronism between the transmitter and receiver. This is usually accomplished by rotating the receiver at a slightly greater speed than the transmitter and then bringing it to a stop at a predetermined position until the receipt of a synchronizing signal from the transmitter indicates the transmitter has arrived at the same corresponding position, thus insuring that both the transmitter and receiver start each cycle of operations at the same position and maintain substantial synchronism throughout the cycle.

The transmitter is provided with means for translating variations in lights and shades into electric currents and this is usually accomplished by an optical system and photoelectric cell. At the receiver, on the other hand, the received electric impulses are translated back into the means for producing corresponding variations in lights and shades of the picture.

These and other features usually make the transmitter and receiver so different in construction and function that they have ordinarily been treated as separate and individual mechanisms, each necessary in the complete system.

In many instances in facsimile transmission, as, for example, for airplane use, it is desirable to have two way facsimile communications and yet the weight and space of the facsimile machine must be kept to a minimum.

Heretofore, it has been regarded as essential, as pointed out above, to employ in such systems a separate transmitter and receiver.

I have discovered that I may employ a single picture field and bring into cooperation therewith a transmitting scanner and a receiving scanner cooperating with the picture field in such a manner that it may act both as a transmitter and alternatively as a receiver.

When acting as a transmitter it in the usual manner transmits synchronizing pulses to a remote receiver. When acting as a receiver it will start-stop in response to synchronizing pulses received from the remote transmitter.

Similarly, the picture field when cooperating with the transmitter translates the variations in lights and shades of the picture into corresponding currents and when cooperating with the receiver translates the received picture currents into corresponding lights and shades on the picture.

I have specifically illustrated my invention as applied to the drum type transmitter but it will be understood that other forms commonly employed in picture transmission systems may also be used.

Thus, in the form I have selected for illustrating my invention a drum carries the image to be transmitted or the recording sheet on which the received picture is to be recorded and either one of two scanning members, one being fixed with respect to the drum and the other rotatable with respect to the drum, are employed.

The recording unit of my invention employs a single drum upon which the electrochemically sensitive paper is mounted for receiving and upon which the photograph or other picture is mounted for transmission.

For recording purposes, a conductive stylus is arranged to circumferentially traverse the surface of the drum in a circular manner while the drum itself does not rotate but is moved parallel to its axis and perpendicular to the plane of rotation of the stylus. Thus I secure the helical scanning motion required for recording upon a sheet of paper mounted upon a drum.

For the transmission of images, my novel unit affords means whereby the drum may be rotated about its axis while being displaced parallel thereto in order to again achieve the helical motion required, relative to a fixed beam of light.

The recording stylus is pivotally mounted on its carriage so that it may be juxtaposed against the recording paper during facsimile reception or may be disengaged from the drum during the transmission of images. In addition, the stylus carriage is slidably mounted within an annular ring which is driven by the source of motive power and which will carry the stylus in fixed relation therewith during the normal recording cycle.

The annular ring supporting the stylus is adjusted to rotate at a slightly higher speed than the corresponding light beam stylus at the transmitter and thus the stylus will arrive at a particular point on the drum ahead of the stylus at the transmitter. I provide synchronizing means, however, for arresting the motion of the stylus prior to the commencement of the following scanning cycle.

These synchronizing means, therefore, maintain the stylus in a fixed position relative to the frame of the facsimile unit while allowing the annular stylus supporting ring to slip relative to the stylus itself. Upon the receipt of a synchronizing impulse generated at the transmitter, the stylus is once more allowed to rotate with the annular supporting ring and traverse the circumference of the drum.

The annular ring comprising the stylus mounting forms an endless track about which the stylus may move. Thus if the stylus supporting ring is adjusted to rotate at a higher speed than the corresponding light beam stylus at the transmitter, the motion of the stylus will be arrested once during each revolution thereof.

In the recorder employing the endless chain type of stylus support, it was necessary to periodically rephase the position of the stylus relative to the support inasmuch as the stylus supporting tracks and guides could only be of relatively limited length. Therefore, as the effect of synchronization was cumulative due to the increased speed of the recorder, there was a danger of allowing the stylus to be withdrawn from its track after several minutes of recording time.

Thus, it was necessary to introduce a second synchronizing means which would reset the stylus at the beginning of its track subsequent to the recording of several inches of the picture.

However, in the present novel type of drum recorder, it is not necessary to rephase the stylus relative to the stylus supporting ring inasmuch as the supporting ring and guide track are in effect endless, that is, circular. Thus, I secure the benefits derived from a synchronizing system in which it is necessary to merely arrest the small mass of the stylus and in addition overcome the difficulties encounted in the rephasing operation of previous machines.

It is an object of my invention to provide for a facsimile recorder and transmitter which may be combined into a single unit and which need only employ a single drum for both functions.

It is another object of my invention to provide for a stylus which is rotatable about a recording drum and which may be cyclically synchronized by the expedient of stopping the relatively small mass of the stylus itself.

It is a further object of my invention to provide for a mechanical system which alloys for both the rotation and axial movement of the drum relative to a fixed scanning means for transmission of pictures; and the axial movement alone of the drum relative to a scanning means rotating thereabout in a fixed plane for reception.

As it is necessary in facsimile recorders and transmitters to receive and generate synchronizing impulses respectively, I provide a series of cams mechanically coupled to the rotating elements which coact with a pair of switching elements to perform the required switching functions. However, as it is necessary for me to vary the type of motion of the drum during recording and transmitting, and as it is desirable to reduce the weight and over-all dimensions of the facsimile unit, I provide novel means whereby I may employ the synchronizing cams not only for switching purposes but also to limit and control the motion of the drum in accordance with the specific operation being performed.

Therefore, a further object of my invention is to provide means for generating synchronizing impulses in conjunction with means for selectively switching the received synchronizing impulses by a plurality of cams coupled to the driving means.

Still a further object of my invention is to construct the cams so that they may function both as synchronizing units and as controlling members for obtaining the desired drum movement.

These and other objects of my invention will become apparent from the following specification taken in connection with the accompanying drawings, in which.

Figure 1:
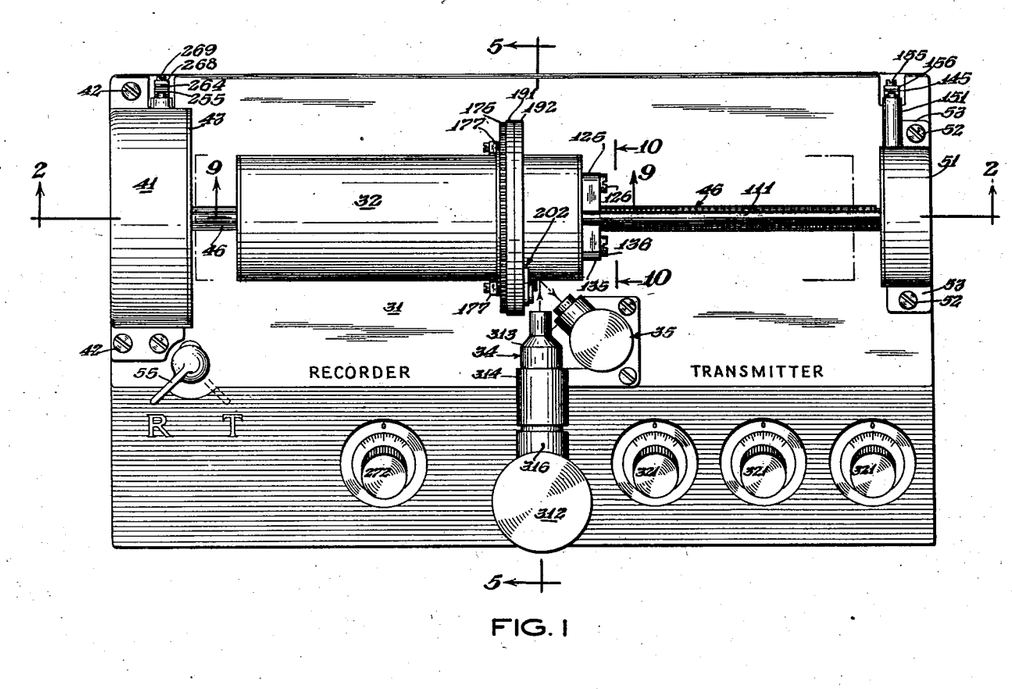
Figure 1 is a plan view of the duplex machine of my invention.
Figures 2, 3, 4:
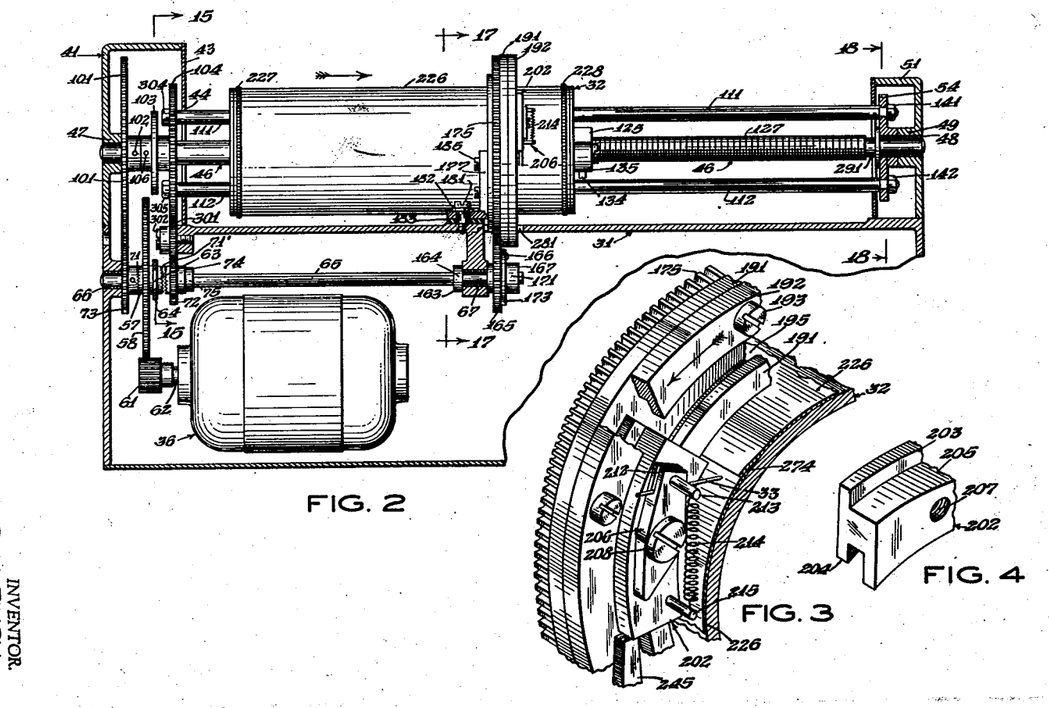
Figure 2 is a cross sectional view of the facsimile recorder and transmitter taken along the line 2—2 of Figure 1.
Figure 3 is a fragmentary perspective view of my novel recording stylus support and guide rail.
Figure 4 is a broken perspective view of the stylus carriage.

Referring now to Figures 1 and 2, there is shown a general view of the duplex facsimile arrangement in which the operating members are all mounted upon a single base 31 of suitable design. The single drum 32 which is employed for both the transmission and reception of images is operatively arranged with respect to the recording stylus 33 and the lamp housing 35 and optical system 34, and the photoelectric cell housing 35, so that these members may interact in the manner hereinafter described.

The source of motive power 36 (Figures 2 and 5) mounted upon the frame by suitable brackets 37 (Figure 5) is coupled to the drum through the mechanical system housed beneath the base 31 and within the projecting metal housing 41 (Figure 1) fixed thereto by means of the plurality of screws 42 which pass through appropriate lugs upon the housing 41.

The mechanical coupling system is completely enclosed within the housing 41 by means of the side cover plate 43 (Figures 1 and 2) which, however, is perforated at 44 to allow for the passage of the feed screw and guide rods of the drum.

The feed screw 46 is driven by the motor 36 which is preferably of the synchronous type, and the necessary speed reduction is secured by means of the gearing contained within the housing 41. The feed screw 46 is rotatably supported within two sleeve bearings, 47 and 48. Bearing 47 is reamed into an integral projection of the wall of the housing 41; the opposite bearing 48 is formed in a corresponding projection 49 upon the wall of the opposite housing 51 mounted upon the frame 31 (see Figures 1 and 2).

The housing 51 is secured to the frame by means of the bolts 52 which engage suitable projections or lugs 53 which have been integrally formed into the housing 51. The housing 51 serves to shield the cam 54 which is loosely mounted upon the feed screw 46.

In order to perform the distinct operations of transmission and reception of images, the feed screw 46 must be maintained in a stationary position for transmitting purposes and must be allowed to rotate under the influence of the driving motor 36 for recording purposes for reasons which will hereinafter more fully be described. This adjustable motion of the feed screw 46 is obtained through the gears contained within the housing 41 and the sliding toothed clutch which is operated by means of the hand lever 55.

Figure 14:
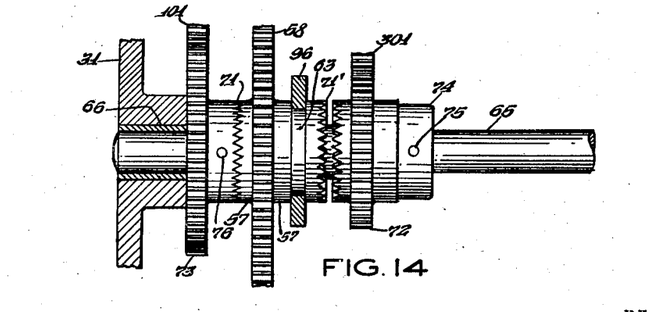
Figure 14 is a view partly in cross-section of the clutch mechanism of Figures 2, 12 and 13 employed to mechanically switch the operation of the unit from a recorder to a transmitter.

The toothed clutch is formed upon the hub 57 (see Figures 2, 12 and especially 14) of a gear 58 which is driven by the pinion 61 which in turn is in fixed relation with respect to the motor shaft 62.

Figure 15:
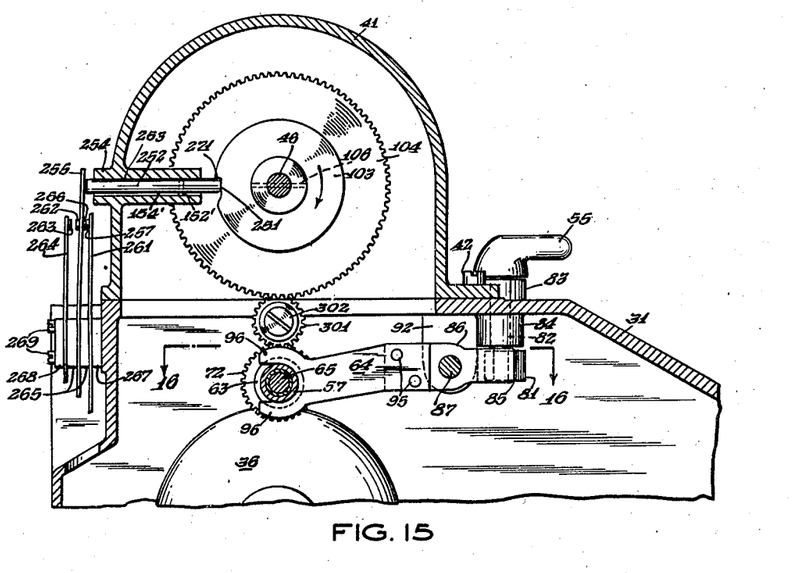
Figure 15 is an end cross-sectional view of the driving mechanism taken along the line 15—15 of Figure 2.
Figure 16:
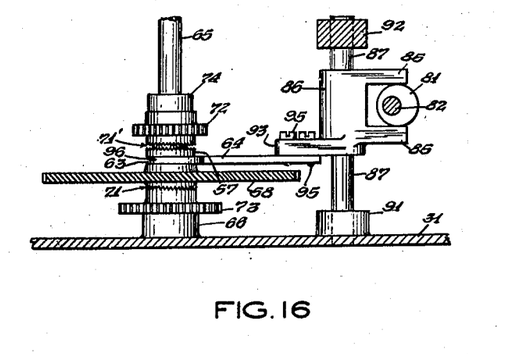
Figure 16 is a cross-sectional view of the clutch and operating means therefor taken along the line 16—16 of Figure 15.

An annular groove 63 which has been turned into the hub of the gear 58 is engageable with a bifurcated lever 64 having the tines 96 as is more clearly illustrated in Figures 14, 15 and 16. The gear 58 is slidably and rotatably mounted upon the shaft 65 which is supported by the two sleeve bearings 66 and 67 integrally formed into the main frame of the facsimile unit.

Referring now to Figure 14, the hub 57 of the gear 58 contains the two milled or otherwise formed sets of teeth 71—71' which are engageable with corresponding teeth upon the two gears 72 and 73 which are also mounted upon the shaft 65. The three gears 73, 58 and 72 are positioned upon the shaft 65 between the sleeve bearing 66 in the wall of the frame 31 and the collar 74 which is fastened to the shaft 65 by means of the pin 75.

Gear 73 is maintained in fixed relation with the shaft 65 by means of the pin 76 which passes through the hub thereof and thus rotation of gear 73 will cause a corresponding rotation of the shaft 65.

It may therefore be seen that gear 58 when driven by pinion 61 and when in the position indicated in Figure 14, that is, having the teeth 71 in engagement with the corresponding teeth upon the gear 73 will cause corresponding rotation of the gear 73 and shaft 65.

The engagement between the teeth 71 as indicated in Figure 14 is obtained by turning the hand lever 55 of Figure 1 to the letter "R" (receiving) and thus causing the desired movement of the bifurcated lever 64 and the slidable gear hub 57.

It should be noted that when gear 58 is in the position indicated in Figure 14, sufficient clearance is allowed between the teeth 71' on the hub 57 and the corresponding teeth on the gear 72 to preclude interference therebetween.

However, movement of the hand lever 55 to the position indicated by the letter T (transmitting) of Figure 1 will accordingly cause motion of gear hub 57 so that the teeth 71' will be engaged with the corresponding teeth upon the gear 72 while providing clearance between the teeth 71 and the corresponding teeth on the gear 73.

The linkage between the hand lever 55 and the gear hub 57 may be of the form indicated in Figures 15 and 16, that is, rotation of the operating lever 55 will cause similar rotation of an eccentrically mounted circular cam 81 which is positioned upon the shaft 82 fixed to the lever 55 in any convenient manner.

The bosses 83 and 84 formed upon the casting of the frame 31 provide, when perforated, a suitable bearing for the shaft 82. The rotation of the eccentric 81 takes place between the tines 85—85 of the bifurcated member 86 which is slidably mounted upon the shaft 87 which in turn is fixed between a boss 91 on the frame of the facsimile unit and a corresponding bearing 92 which is an integrally formed projecting lug.

A protrusion or lug 93 of the bifurcated member 86 carries the bifurcated member 64 which is in engagement with the annular groove 63 on the hub of the gear 58.

During the assembly of the facsimile unit, the bifurcated lever 64 is first engaged with the slot on the gear hub and is then fastened to the lug 93 by means of the plurality of screws 95 which pass through aligned tapped perforations in both members.

Therefore, rotation of the eccentrically mounted circular member 81 about its supporting shaft 82 which is maintained in fixed position with respect to the frame will cause the bifurcated member 86 to slide along the shaft 87 and thus similarly operate the slidable gear 58.

The tines 96—96 of the bifurcated lever 64 supported upon the gear hub 57, preclude rotation of the member 86 about its shaft, while allowing the gear 58 to rotate about the shaft 65 without developing undue frictional forces within the groove 63.

Obviously the clutch mechanism on the gear 58 and the operating lever 55 and its associated linking members may be replaced by any of the well known types of sliding clutches which are engageable with several gears.

When the clutch is in the position illustrated in Figures 14 and 16, the duplex facsimile unit is in condition for the reception of facsimile impulses and the recording thereof. This may be more clearly illustrated by Figures 2 and 12 which show the complete gear arrangement when the clutch is in the receiving position. Thus it may be seen that the motor pinion 61 continuously drives the gear 58 which is considerably larger in order to reduce the speed as required by the particular motor employed. Inasmuch as the clutch teeth on gear 58 are in engagement with those on gear 73 which in turn is pinned to the shaft 65, shaft 65 will rotate and in addition, the gear 101 which is in engagement with the gear 73 will rotate again at a reduced speed due to increased diameter.

Gear 101 is fixed relative to the feed screw 46 and is maintained thus by means of the pin 102 which passes through the gear hub and through a similar perforation in the shaft.

Also mounted upon the shaft of the feed screw 46 and contained within the housing 41 are the cam 103 and the gear 104. These are positioned within the housing between the face of bearing 47 and the shoulder 105 which has been turned into the shaft.

Figure 12:
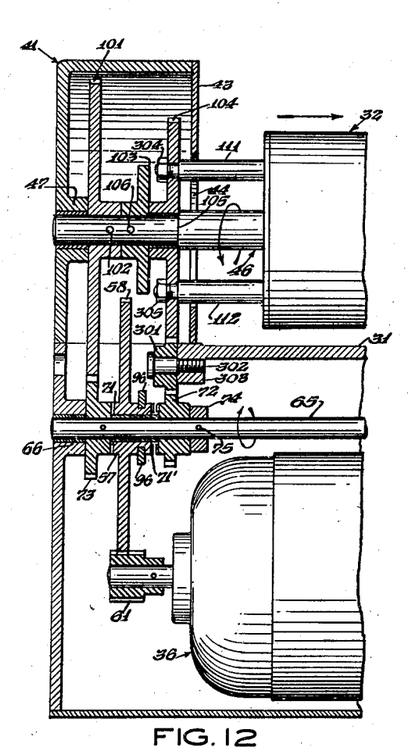
Figure 12 is an enlarged cross-sectional view of the mechanical drive system (corresponding to the left portion of Figure 2) when employed for recording facsimile signals.

Rotation of the gear 101, which will occur when the clutch is in the position of Figure 12, will correspondingly result in rotation of the feed screw 46 and the cam 103 which has been fixed thereto by means of the pin 106. However, gear 104 upon which are mounted guide shafts 111 and 112 does not rotate during the rotation of feed screw 46 for reasons which will hereinafter be described.

Also it will be seen that the fixing of gear 104 will maintain the drum 32 in a position which will preclude rotation relative to the frame of the facsimile unit. However, rotation of the feed screw will cause the drum to move axially at a rate which will be determined by the speed of the motor.

Figures 9, 10, 11:
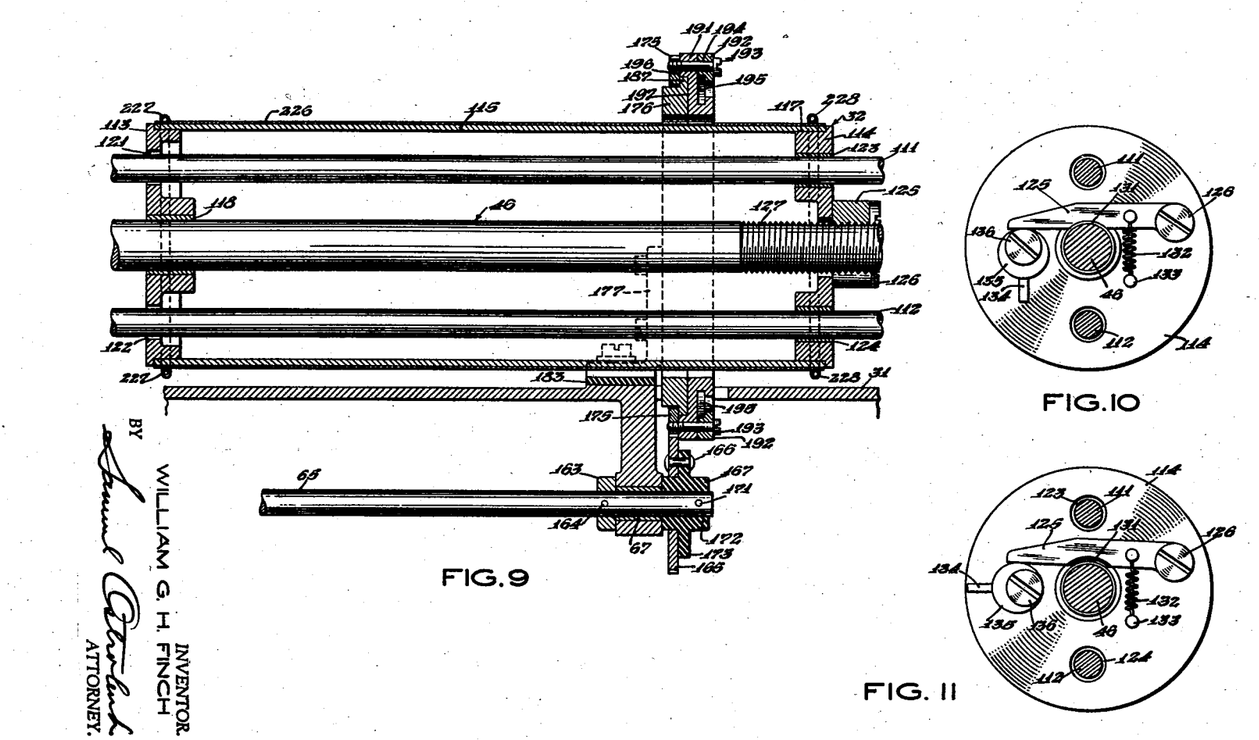
Figure 9 is a broken cross-sectional view of the drum employed for both the reception and transmission of images taken along the line 9—9 of Figure 1.
Figure 10 is an end cross-sectional view of the drum taken along the line 10—10 of Figure 1 and illustrates the means for obtaining axial displacement of the drum during recording.
Figure 11 is a view corresponding to that of Figure 10 illustrating the drum displacing means in the inoperative position.

This is more clearly illustrated by Figures 2, 9, 10 and 11 and reference is now made thereto. The two parallel, diametrically spaced guide rods 111 and 112 pass through the circular side walls 113 and 114 of the drum through corresponding diametrically spaced perforations therein. In addition, the feed screw 46 which, as indicated in Figure 9, is not threaded for the full length, passes through the circular side walls and in cooperation with the guide shafts 113 and 114 serves to position the cylindrical drum. The drum in itself is formed from a sheet of metal bent into the form of a cylinder 115 which is then mounted upon the two turned side walls 113 and 114 and positioned thereon in the recesses 116 and 117 respectively.

The side wall 113 of the drum contains a central sleeve bearing 118 which is slidably and rotatably fitted over the unthreaded part of the feed screw shaft 46. However, the perforations 121 and 122 within the side wall 113 are of sufficient diameter to provide clearance for the guide shafts 111 and 112 which extend from their fastening upon the gear 104 to their fastening upon the cam 54 which is contained within the oppositely positioned housing 51.

The perforations 123 and 124 within the side wall 114 are lined with a metal suitable for bearing surfaces and the guide shafts 111 and 112 are slidably fitted therein. Thus when the drum is in the position indicated in Figure 9, it is supported upon the guide shafts 111 and 112 by the bearings 123 and 124 and upon the feed screw shaft by the sleeve bearing 118.

Axial motion of the drum parallel to the shaft 46 is obtained by allowing lever 125 which is pivotally connected to the side wall 114 of the drum by means of the shoulder bolt 126 to come in contact with the screw threads 127 which have been cut into the shaft 46.

The circular segment 131 has been cut into the lever arm 125 and has been threaded to engage with the threads 127. Lever arm 125 is biased towards the shaft 46 by means of the spring 132 connected thereto and which is fastened to the side wall 114 of the drum by means of the pin 133.

It is possible, however, to manually remove the lever 125 from engagement with the screw threads 127 by actuating the member 134 which is an integral part of the eccentric 135 which in turn is pivotally mounted upon the side wall 114 of the drum by means of the shoulder bolt 136. In Figure 10, the lever 134 is in a position for allowing the lever arm 125 to contact the screw threads 127 under the influence of the spring 132.

Figure 11 again illustrates the side wall 114 of the drum but in this view the eccentric 135 has been rotated by means of the lever 134 and as illustrated, the lever arm 125 has been disengaged from the screw threads on the drive shaft 46.

The shoulder bolt 126 precludes a motion of lever arm 125 other than rotation about its pivot and thus when the screw threads are in engagement as indicated in Figure 10, rotation of the feed screw 46 will result in relative axial motion between the drum and the feed screw. Dependent upon the direction of rotation of the motor, and the direction of the axial drum displacement desired, the threads 127 of the feed screw may have to be cut as left hand or right hand threads.

It is necessary to preclude rotation of the drum which may be a result of frictional forces developed at the surface engagement between threads 131 and 127.

Thus as will be hereinafter described, the parallel guide rods 121 and 122 are maintained in a stationary relation with respect to the frame 31 in order that rotation of the feed screw will not cause corresponding rotation of the drum but permit only axial displacements thereof.

Therefore, when the toothed clutch is in the position indicated in Figures 2 and 12, the drum will progress axially without rotation about its axis. From the general view of Figures 1 and 2, it may be seen that the length of the shaft 46 must be at least twice the length of the drum and must in addition provide additional space for the mounting of the gears and the insertion of the shaft into its bearings. The dashed lines in Figure 1 indicate the limits of the drum travel.

Inasmuch as the motion of the stylus is limited to a plane perpendicular to the axis of the drum as will hereinafter be pointed out, the helical recording motion must be attained by axial displacements of the drum. Therefore, if the stylus is to traverse the complete length of the picture, it will be necessary to provide a feed screw of length sufficient to accommodate the entire drum.

The parallel guide rods 111 and 112 may be maintained in fixed space relation with respect to the frame 31 of the facsimile unit when the clutch is in the position indicated in Figures 2 and 12 by suitably locking them or otherwise fastening them thereto. However, as my duplex machine is designed to be as compact as possible and to eliminate as much as possible needless, weighty parts, I employ the cam 54, upon which the two guide rods are fastened by nuts 141 and 142, as a locking device against reverse motion of the parallel rods. The manner in which this is accomplished is best illustrated by the cross-sectional view, Figure 18, of the cam housing.

The cam 54 is a plate of metal and contains the notch 143, which during the transmission of facsimile images is employed in conjunction with rod 144 and switch blades 145 and 146 for the generation of synchronizing impulses. Inasmuch as the tendency towards rotation of the rods 111 and 112 and their associated mounting plate or cam 54 is in the direction opposite to that required for the transmission of facsimile impulses, the notch 143 and the rod 144 may be employed to lock the cam 54 in place and thus prevent any reverse motion thereof.

Figure 18:
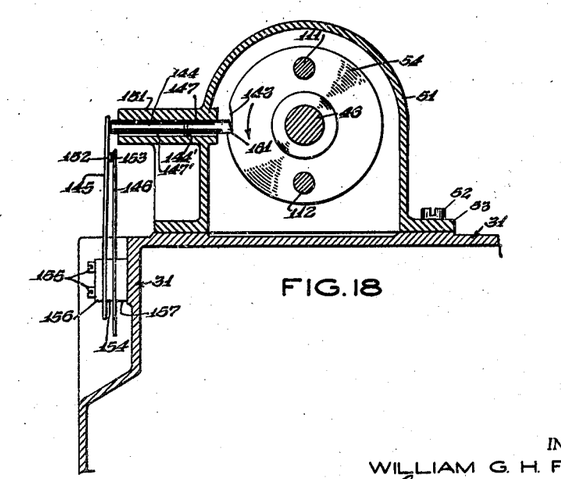
Figure 18 is an end cross-sectional view of the switching means for generating synchronizing impulses taken along the line 18—18 of Figure 2.

In the embodiment illustrated in Figure 18, the rod 144 slides smoothly within a housing formed by drilling out a hole 147 in an integrally formed protrusion 151 of the housing 51. The rod 144 is prevented from turning by the key pin 144' which slides in keyway 147' in the bore 147.

The rod 144 is biased towards the center of the shaft 46 by means of the leaf spring 145 which also serves as a switching member in that it carries contact 152 in a position where it may cooperate with a contact 153 mounted upon the metal arm 146. Both arms 145 and 146 are separated by a layer of insulating material 154 and the entire assembly is fastened to the frame by means of a plurality of bolts 155 which in turn are insulated from the frame 31 of the facsimile unit by the insulating layers 156 and 157. When the cam is in the position illustrated in Figure 18, rod 144 is forced into engagement with the notch 143 and the contacts 152 and 153 are in surface engagement with each other. Thus, any electrical circuit connected to the metal members 145 and 146 will be closed.

If the cam 54 is rotated in the direction of the arrow head indicated in Figure 18, the rod 144 will slide within the bore 147 as the rod 144 rises along the notch 143. Upon reaching the outer edge of the cam 54, the rod 144 has been displaced sufficiently to open the contacts 152 and 153 and thus break the circuit into which they are connected.

However, it may be seen that the edge 161 of the cam notch 143 has been cut radially and thus any tendency towards rotation in a direction opposite to that indicated by the arrow head of Figure 18, will be arrested by the juxtaposition of rod 144 and face 161 of the notch 143.

As previously described, when in the position indicated in Figures 2 and 12, the clutch teeth 71 will engage the gear 73 which is pinned to the shaft 65 and thus will cause rotation thereof in the direction indicated by the arrow head of Figure 12.

The shaft 65 is rotatably carried in the sleeve bearings 66 and 67 formed into the frame 31 and is positioned thereon by means of the collar 163 which is fixed thereto by means of the pin 164. Also secured to the end of shaft 65 is a gear 165 which is clearly illustrated in Figures 2, 9 and 17.

Referring now to Figure 9, it may be seen that the gear 165 is an annular member fastened by means of a plurality of rivets 166 to an insulating bushing 167 which in turn is secured to the shaft by means of pin 171.

The insulating bushing 167 is drilled out at 172 to slip over the shaft 65 and contains the annular projection 173 to which the gear is fastened. Thus it should be noted that the gear 165 is electrically insulated from the frame of the facsimile unit, for reasons which will hereinafter be described.

Gear 165 is in engagement with a larger annular gear 175 which in this embodiment completely surrounds the drum 32 and which is supported on suitable brackets as will now be described.

Figure 17:
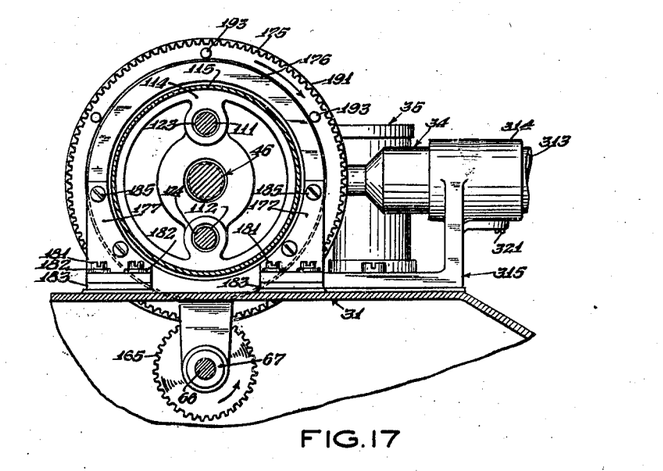
Figure 17 is an end cross-sectional view of the stylus operating means and drum taken along the line 17—17 of Figure 2.

An annular member 176 also surrounding the drum is fastened to the frame 31 of the facsimile unit by means of brackets 177—177 oppositely spaced as indicated in Figure 17. These brackets are carefully oriented upon the frame by a plurality of machine screws 181 which are insulated from the brackets by means of the fiber or other insulating spacers 182 and the brackets 177 are in turn insulated from the frame by means of the spacers 183 of insulating material.

As indicated in Figure 2, these brackets 177 do not interfere or in any way impair the free motion of gear 175. The annular ring 176 is supported on the brackets by a plurality of bolts 185 which are suitably spaced around the periphery thereof and which position the annular member 176 so that it is coaxial with the shaft 46.

As indicated in Figure 9, the cross-section of the annular member 176 is such as to provide a ring shaped projection 187 which acts as a track for the gear 175 and its associated apparatus. That is, an assembly is built up of gear 175, annular member 191 and annular member 192 as indicated in Figure 9, and these members are maintained in rigid relation with respect to each other by means of a plurality of bolts 193 passing through cylindrical openings 194 provided by corresponding perforations within each of these members.

The members 191 and 192 provide, when assembled as illustrated, a T-shaped groove 195 which due to the symmetry of the circular members is in itself circular and thus in effect endless.

Furthermore, if during assembly of the facsimile unit, annular members 191 and 192 are first fastened to each other and are then joined to annular gear 175 after the annular gear 175 is placed in juxtaposition with the annular projection 187 of the fixed member 176, the composite assembly of the three members 175, 191 and 192 will be rotatable about the fixed member 176, provided that the frictional forces along the juxtaposed surface 196 and 197 are not excessive.

Thus it should be noted that rotation of shaft 65 will correspondingly rotate gear 165 and annular gear 175. Therefore rotation of shaft 65 will result in rotation of the composite annular ring formed by the members 175 and 191 and 192, about the axis of the drum. It should also be noted that in this embodiment of the invention, it was necessary to perforate the frame 31 at 201 in order to provide clearance for the composite annular ring and to allow for engagement of the annular gear 175 with gear 165.

As will now be described, the circular T-shaped track 195 formed between members 191 and 192 serves as a guide rail for a stylus carriage 202 as illustrated in Figures 3 and 4.

The carriage 202 is a metal member formed to correspond with the T-shaped track and is curved as a segment of the circle of the track. Thus the member 202 has projections 203 and 204 to engage the T-shaped track and also contains a body of metal 205 which carries the stylus and the stylus assembly itself.

Figures 6, 7, 8:
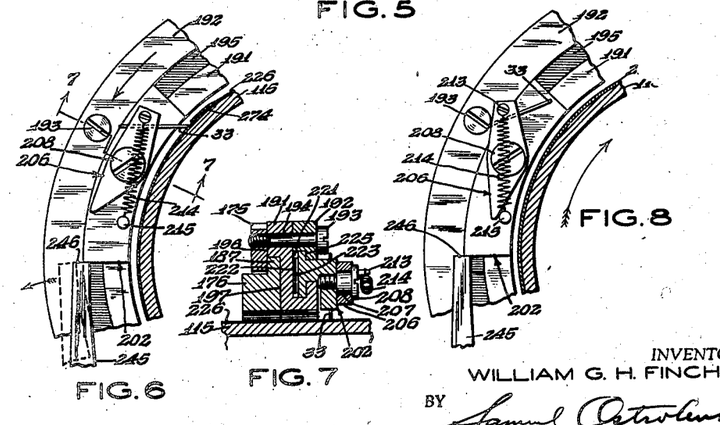
Figure 6 is a broken end view of the stylus support, drum and synchronizing lever, and is an enlarged fragmentary portion of Figure 5 illustrating the stylus in operative position.
Figure 7 is a cross-sectional view of the stylus carriage and the support therefor taken along the axis 7—7 of Figure 6.
Figure 8 is a view corresponding to that of Figure 6 illustrating the recording stylus in the inoperative or transmitting position.

The stylus holder 206 is a metallic member perforated at 207 as illustrated in Figure 4 and in the cross-sectional view of Figure 7. This perforation 207 allows the passage of a shoulder bolt 208 which rotatably supports the stylus upon the stylus carriage 202. In the embodiment illustrated, the stylus 33 is fixed to the holder 206 within a slot 212 which has been formed therein. The metal on either side of the slot is clamped together about the stylus 33 by means of the pin and set-screw 213 which passes through tapped perforations therein and which may be adjusted by means of an ordinary wrench. Also fastened to the set screw 213 is an over-center spring 214 which is also connected to the stylus carriage 202 through a pin 215. Thus, when the stylus is juxtaposed against the paper as illustrated in Figure 6, the line of action of the force of the spring 214 is such as to maintain the juxtaposition thereof. However, if the stylus carriage is rotated manually or by any other means about its pivot, shoulder bolt 208, the stylus will arrive at the position indicated in Figure 8 wherein it may be seen that there is no contact between the stylus and the drum.

Furthermore, the rotation of the pin and set screw 213 in this process has moved the line of action of the spring over the center of the pivot and thus the tendency is to maintain the stylus in the position indicated. Obviously, this provision is made for converting the unit from a recorder (position indicated in Figure 6) to a transmitter (when the stylus is moved to the position indicated in Figure 8).

The pivotal mounting of the stylus 53 will greatly facilitate its accommodation to irregularities in the recording paper, particularly to the seam 274.

Referring now to Figures 3 and 7, the stylus carriage 202 is mounted slidably within the T-shaped track 195 during the assembly of the composite annular rings 191 and 192. The depth of the T-shaped slot 195 is somewhat greater than the depth of metal of the projections 203 and 204 and thus clearance is provided at 221 as shown in Figure 7 between the rear of the stylus carriage and the face of the T-shaped slot. This clearance, however, is taken up by means of a bent leaf spring 222 which is fastened in any suitable manner to the face 223 of the stylus carriage and which bears against the rear face of the T-shaped slot 195.

Thus the stylus carriage is forced into juxtaposition with the track formed by the T-shaped slot along the wall 225, and the frictional engagement therebetween is sufficiently great to ensure that rotation of the composite annular ring formed by the annular gear 175 and the track members will ensure corresponding rotation of the stylus carriage.

Figure 5:
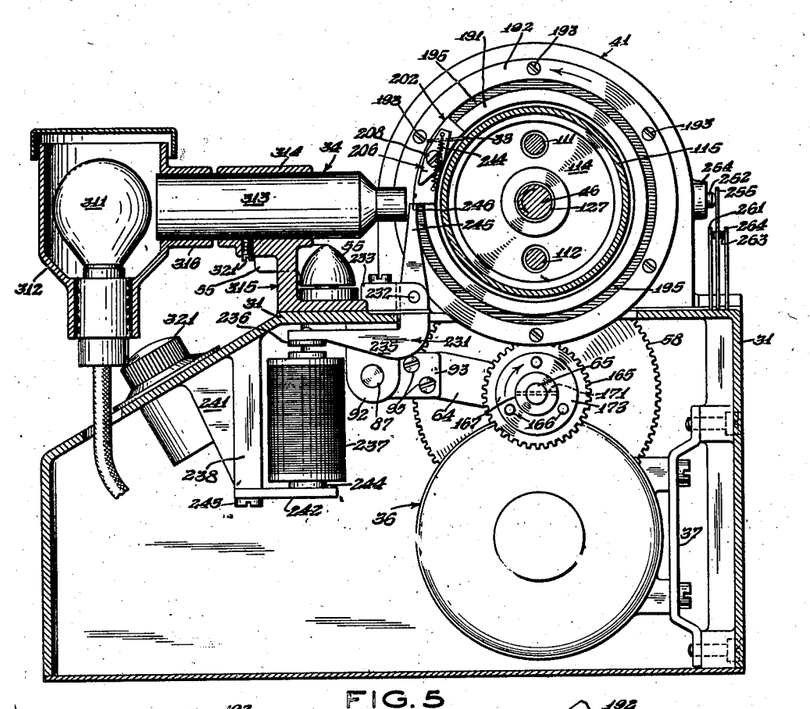
Figure 5 is a cross-sectional view illustrating various mechanical features of the optical system employed and is taken along the line 5—5 of Figure 1.

In addition, the frictional retarding forces developed between the stylus 33 and the paper 226, which may be mounted upon the recording drum by means of the two garter springs 227 and 228, will not cause relative slipping between the stylus carriage and the track members However, I provide synchronizing means for arresting the motion of the stylus carriage, and thus the stylus itself. In this embodiment, the synchronizing means assumes the form of a lever arm 231, pivotally mounted by means of the pin 232, as illustrated in Figure 5. The pin 232 is carried within a bracket 233 which is in turn fixed to the frame 31 of the facsimile unit and which is insulated therefrom by suitable insulating material such as fiber, Bakelite or the like.

One arm 235 of the lever 231 carries a piece of magnetic material 236 and is of suitable length so that the magnetic material 236 is supported over the synchronizing magnet 237. The magnet 237 itself is carried upon an integrally molded protrusion 238 which is reinforced by the rib of metal 241 and which carries the magnet supporting cross-arm 242 by means of the plurality of machine screws 243. Thus electromagnetic attraction between the core 244 of the magnet 237 and the magnetic material or armature 236 will cause rotation of the synchronizing lever 231 about the pivot 232.

The second arm 245 of the lever 231 projects through a perforation in the housing of the facsimile unit 31, and is in the plane of the stylus carriage 202. When in the position illustrated in Figure 5, (no attractive force between the core 244 and the magnetic material 236) the lever arm 245 is biased so that it engages the stylus carriage at the junction of the surfaces 246. The biasing of the lever may be produced by suitably weighting the lever arm 245 or by a small spring oriented to produce clockwise rotation of the lever arm 231 when viewed as in Figure 5.

The faces 246 of the lever arm 245 and the stylus carriage 202 are polished in order to ensure a minimum of frictional resistance therebetween and therefore upon energization of the synchronizing magnet 237 the faces 246 will easily separate and allow clearance for the rotation of the stylus carriage 202. The action of the synchronizing lever arm is more clearly illustrated in the enlarged view of Figure 6 wherein the lever arm 245 is first represented by a solid line to indicate the normal position towards which the biasing spring or other means tends to position the arm. However, upon receipt of the synchronizing impulse, and energization of the magnet, the lever arm 245 will move in the direction of the arrow head to the position indicated by the dashed line and it may be seen that sufficient clearance is allowed for the normal rotation of the stylus carriage.

Thus the motion of the stylus carriage 202 will be unimpeded and will be carried along by the annular ring by the frictional engagement therebetween until the lever arm 245 comes into engagement therewith. At this point, relative rotation between the annular ring and the stylus carriage will begin immediately inasmuch as the stylus carriage 202 is held in a fixed position and the annular ring is being positively driven by the source of motive power. A proper adjustment of the frictional forces exerted by the leaf spring 221 will preclude the possibility of excessively loading the motor or generating excessive heat due to the frictional contact therebetween.

In the present day facsimile recorders and transmitters, synchronism is effected by means of an impulse generated at the transmitter prior to the commencement of a scanning cycle. This impulse may be in the form of an increase of amplitude or a signal of a distinct frequency as described in my copending application Serial No. 203,222, filed April 21, 1938.

In order to preclude the recording of the synchronizing impulse upon the electrochemically sensitized paper, I provide switching means at the receiver to selectively separate synchronizing impulses and picture signals.

In this embodiment of my invention, I accomplish this by means of a cam 103 which is fixedly mounted upon the shaft 46 as illustrated in Figure 15. A notch 251 in the cam coacts with the slider rod 252, which is slidably positioned within a cylindrical sleeve bearing 253 formed by suitably drilling or reaming an integrally molded lug 254 of the housing 41. The rod 252 is prevented from turning by the key pin 152' which slides in key way 154' in the bore 253.

The rod 252 is continuously biased towards the center of the shaft 46 by means of a spring which in this embodiment of my invention is the leaf of metal 255 of the synchronizing switch. When in the position illustrated in Figure 15, the rod 252 has been displaced into the notch 251 and contacts 256 and 257 on the leaf of metal 255 and 261 respectively are in juxtaposition and thus an electrical circuit connected thereto will be closed.

However, rotation of the cam 103 in the direction indicated by the arrow head in Figure 15, (which is the direction of rotation during receiving) will bring rod 252 up upon the circular edge of the cam and thus displace leaf 255 to close contacts 262 and 263 mounted upon the leaves 255 and 264 respectively.

The metal leaves of the switching member are separated from each other by insulating layers 265 and 266 which in turn are fixed to the frame by a plurality of screws 269 insulated therefrom by means of insulating layers 267 and 268.

The cam 103 is positioned upon the shaft 46 so that the rod 152 is actuated prior to the inception of a synchronizing impulse. Actuation of rod 252 connects the incoming signal from the recording stylus to the synchronizing magnet and the electrical filter which is associated with the synchronizing magnet, if the magnet is operated by one distinct frequency.

Immediately after the reception of the synchronizing impulse and the movement of lever arm 245, the rod 252 again connects the incoming signal to the stylus due to its rise upon the edge of the cam 103.

The notch 251 of the cam 103 has been cut with a radial face 271 to engage with the edge of rod 252 as seen in Figure 15. Thus it is obvious that reverse motion of cam 103 is impossible (this will be more fully described in relation to the transmitter operation of my duplex facsimile machine).

Summarizing now, the operation of my machine as a recording device is as follows: The sensitized paper is first mounted upon the drum by means of the garter springs 227 and 228 and the lever arm 125 fastened to the wall of the drum 114 and containing the segment of the nut 131 is raised and the drum is then slidably moved to the left as viewed in Figures 1 and 2 to the beginning of the threaded portion 127 of the shaft 46. Here rotation of the eccentric 135 again allows engagement between the segment of the nut 131 and the screw threads 127.

The hand lever 155 is moved to the position R indicated in Figure 1 and thus the toothed clutch cut upon the gear hub 157 is displaced to the position indicated in Figures 2 and 12. The stylus support 206 is rotated to the position indicated in Figure 6 so that the point of the stylus 33 is in juxtaposition with the recording paper.

The incoming signal is impressed between the stylus and the conductive drum and the motor is energized. This results in rotation of shaft 65 and shaft 46, while guide rods 111 and 112 are fixed by cam 54 and rod 144 to prevent rotation of the drum.

Thus the engagement between the segment of the nut 131 and the threaded portion 127 of the shaft 46 will result in an axial displacement of the drum to the right as viewed in Figures 1 and 2. In addition, the rotation of shaft 65 and its attached gear 165 will cause rotation of the composite structure of the annular gear 175 and the track members 191 and 192 about the center of the shaft 46. The direction of rotation of the annular composite ring is such as to carry the stylus in the direction indicated by the arrow head of Figure 6 and it should be noted that the overlapping portions of the paper 274 are fixed to preclude interference with the stylus.

Continued rotation of the stylus and the composite annular members will result in a helical scanning of the recording drum. However, at the termination of each circular scanning excursion, the stylus carriage 202 is arrested by means of the lever arm 245 which has been placed in the path thereof.

In order to ascertain that the stylus will arrive at the face 246 of the lever arm prior to the arrival of the scanning stylus at the transmitter at the corresponding point, the composite annular ring is driven at a slightly higher speed.

If synchronous motors are employed at both transmitting and receiving ends, this slightly higher speed may be attained by making the tooth ratio of gears 175 to gear 165 slightly less than a corresponding ratio at the transmitter. If non-synchronous motors are employed, the receiving motor may be governed to a slightly higher speed.

Thus once during each circular cycle, the stylus carriage and its associated stylus will be allowed to rotate relative to the annular supporting members and it is important to note that the mass of the stylus carriage which is stopped is relatively small as compared to the mass of the annular gear and track members and their associated driving members.

Upon the receipt of a synchronizing impulse, the stylus carriage 202 will immediately be freed and rotation without relative slipping between the stylus and the annular track members will be resumed.

The screw threads 127 are cut so that the drum progresses as required by the picture being received and in most instances is designed to progress 1/100 of an inch per revolution of the shaft 127.

This therefore produces one hundred scanning lines per inch. If, however, greater definition is desired and is justified by the recording and transmitting means, the screw threads 127 may be appropriately machined.

The cam 54 and its integral notch 143 prevent, as previously described, motion of the drum due to the frictional forces developed at the engagement between the segment of the nut 131 and the screw threads 127.

Upon the completion of the picture, the segment of the nut 131 will have progressed to the point 291 on the shaft 46 whereat the threads 127 have been terminated. Thus the segment of the nut will cease to act upon the drum and axial displacement thereof will also be terminated.

It may be seen that the stylus carriage 202 will be displaced somewhat relative to the annular track members at the termination of each scanning cycle. This displacement is due to the need for synchronizing the transmitter and receiving devices. However, as the T-shaped track 195 is in effect endless, that is, circular, the displacements of the stylus carriage within this track will have no effect upon the following cycle, that is, it will not be necessary to reset the stylus to its original position during each circular scanning cycle.

However, if the transmitter and receivers are operating from power supplies which are not interconnected or if the devices are operating at different speeds as required by the synchronizing means, the displacement of carriage 202 within the track 195 will be cumulative and its relative displacement with respect to the notch 251 of the cam 103 will be additive for each succeeding cycle.

After the completion of several hundred scanning lines, perhaps, the stylus could be rephased relative to the cam, similar to the styli of my multi-stylus recorder, as indicated in my application Serial No. 334,404. If, however, the synchronizing switch were actuated by the stylus or the stylus carriage itself, there would be no such progressive displacement and therefore synchronization may be effected by continuously displacing the stylus with respect to its supporting track without the need for rephasing the stylus with respect to the switching cam.

In order to operate my duplex facsimile machine as a transmitter, I actuate the hand lever 55 to the position T indicated in Figure 1 and thus cause the eccentric 81 (Figure 16) to operate the bifurcated lever 64 and engage clutch teeth 71' with the corresponding teeth upon the hub of the gear 72 while allowing clearance between the clutch teeth 71 and the corresponding teeth on the hub of the gear 73.

Figure 13:
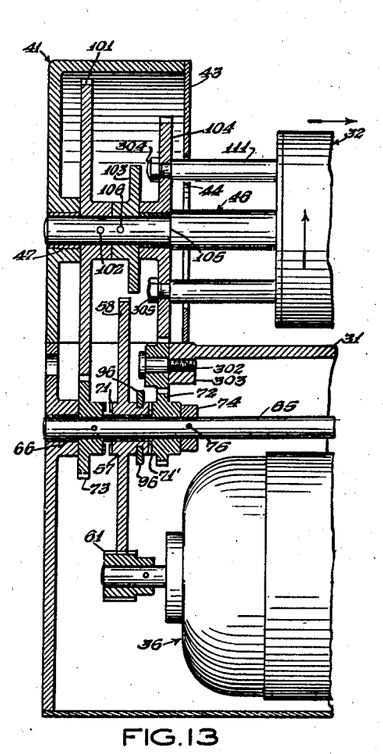
Figure 13 corresponds to Figure 12, showing the drive mechanism during the transmission of images.

Figure 13 indicates the clutch when moved to the transmitting position. As the gear 72 is free and rotatable with respect to the shaft 65, the engagement during the transmitting position will not result in rotation of shaft 65 other than that which may be due to the slight frictional forces between the gear bearings and shaft itself.

However, rotation of gear 72 will cause rotation of idler gear 301 which is rotatably supported upon the shoulder bolt 302 that is fixed to a lug 303 of the frame 31. The idler gear 301 which is in toothed engagement with gears 72 and 104 is interposed to merely reverse the direction of rotation of gear 104.

Gear 104 which is rotatably mounted upon shaft 46 carries fixed thereto by means of bolts 304 and 305 the two parallel guide rods 111 and 112 and thus rotation of gear 104 will result in a positive rotation of the drum 32.

However, this rotation of the drum is opposite to the direction of rotation of the shaft 46 which resulted from the motion of hand lever 55 to the position R of Figure 1.

If now the shaft 46 is maintained in a fixed position and rotation thereof is prevented and if the segment of the nut 131 is allowed to engage screw threads 127, the drum while rotating will once more progress axially towards the right as viewed in Figures 1 and 2.

The frictional engagement between rotating gear 104 and shaft 46 is such that there is a tendency to drive shaft 46 in a direction opposite to that while receiving. Therefore, as previously mentioned, the notch 251 of the cam 103 will engage the rod 252 at face 271 and prevent such reverse motion.

In addition, the rotation of the parallel rods 111 and 112 in the direction indicated will allow free rotation of cam 54 and thus during each cycle of rotation the contacts 152 and 153 will open and reclose.

During transmission, the image is again mounted upon the drum by means of the garter springs 227 and 228 but the recording stylus 33 is moved to the position indicated in Figure 8 to preclude engagement with the face of the picture.

At this point, the lamp 311 contained within the housing 312 which is of a suitable design, and may be of the type indicated in my application for patent Ser. No. 318,230 is illuminated and a spot of light is focussed by the optical system 34 upon the face of the image to be transmitted. The optical system of this unit is carried by the cylindrical bearing 314 which is mounted upon the frame 31 of the unit at 315.

The necessary adjustments of the lamp housing and the optical system are secured by slidably adjusting the relative position of lamp and optical system in the sleeve bearings 316 and 317. The set screw 321 serves to fix the optical system after adjustment.

The beam of light as reflected from the surface of the image to be transmitted is converted to corresponding electrical impulses by the photoelectric cell in housing 35 and the level of the signal and light beam intensity may be adjusted by the controls 321 contained on the sloping face of the panel 31.

The helical scanning required is obtained by maintaining a fixed beam of light and rotating the drum about its axis while it also is displaced axially. At the termination of each scanning cycle, the rod 144 operates the switch contacts 152 and 153 to generate the required synchronizing impulse. The electrical connections to the synchronizing impulse generator may be similar to those illustrated in my aforementioned patent.

Thus it may be seen that by operating the hand lever 55 in the direction T, I may convert my unit from a facsimile recorder to a transmitter and thus it is quite obvious that it has considerable application in military, police and work of a similar nature.

I may, of course, employ my improved synchronizing means on a unit which merely contains the gears and apparatus necessary for the reception of electrical impulses. Therefore, I may eliminate the transmitting synchronizing impulse generator and the lamp housing and photoelectric cell and their associated electrical connections.

As has been previously described, it is necessary to prevent rotation of the drum during recording while it is necessary to prevent motion of the feed screw during the transmission of facsimile pictures. In the foregoing I have described a means for preventing these undesirable motions by utilizing the synchronizing impulse separating and generating cams. In addition, I have devised a modified form of driving mechanism which may be employed in conjunction with my duplex machine and which is especially adapted to the unit in which I mount the synchronizing switch in operative relation with the stylus, and is illustrated by Figures 19 through 23.

Figures 19, 20:
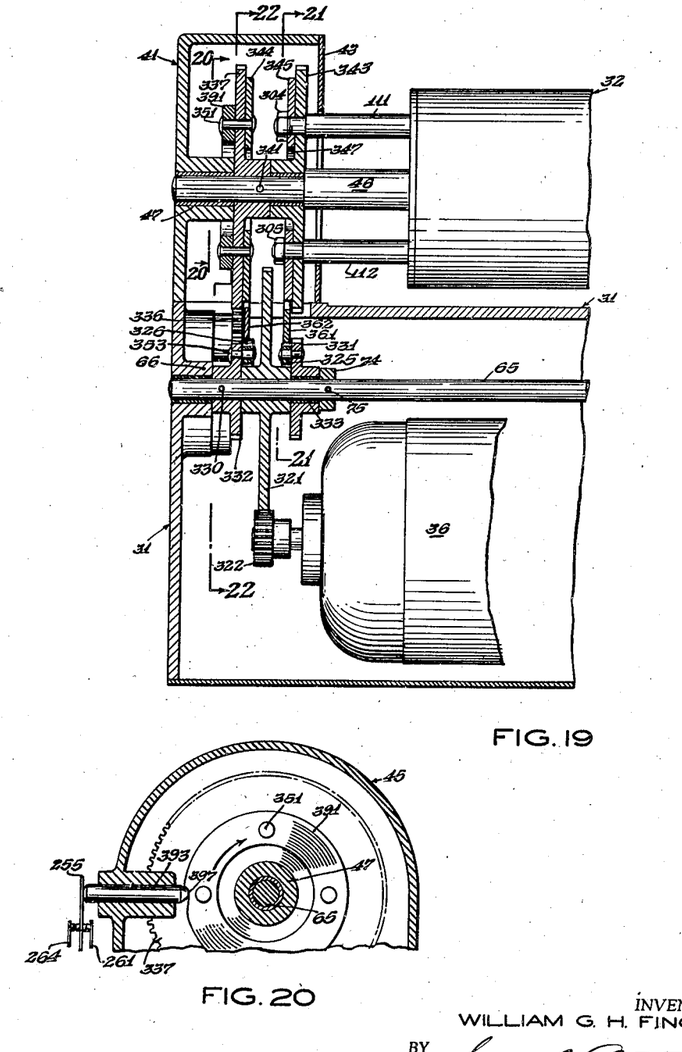
Figure 19 is a cross-sectional view of a modified form of the driving mechanism of Figures 2, 12 and 13.
Figure 20 is an end cross-sectional view of the synchronizing cam taken along the line 20—20 of Figure 19.

Figure 19 indicates that the driving motor 36 drives a gear 321 through a pinion 322 fastened to the drive shaft. Instead of the toothed clutch which was cut into both sides of the hub of the gear 58, illustrated in Figure 2, the hub of the drive gear 321 contains two indentations 323 and 324 (Figures 21 and 22) which may engage the pawls 325 and 326 as will now be described.

The shaft 65, which again operates when rotating the annular stylus drive gear 175, carries the gear 321 and two additional gears 331 and 332 and the three gears are positioned on the shaft between the bearing 66 and the collar 74 as in Figure 14 of the previously described mechanism.

Gear 332 is secured to shaft 65 by means of the pin 330 while gear 331 is allowed to rotate freely thereon and is therefore lined with a suitable bearing material 333. When gear 332 is driven, shaft 65 will rotate and also will drive the two idler gears 335 and 336 which transmit the power to the gear 337 which is secured by means of pin 341 to the feed end screw 46.

Rotation of gear 331 will not cause rotation of shaft 65 but will, however, drive idler gear 341 which is rotatably secured to the frame by means of shoulder bolt 342 and which will in turn drive gear 343. Gear 343 is freely and rotatably mounted upon shaft 46 and carries the two parallel guide rods 111 and 112 by means of bolts 304 and 305. It is apparent that gear 343 will rotate in a direction opposite to that of gear 337 inasmuch as gear 337 is driven from the same source of power through the two idler gears and gear 343 is driven through one idler gear.

Mounted upon gears 337 and 343 are two cams 344 and 345 which are merely sheets of metal perforated at 346 and 347 respectively in order to pass over the hubs of their respective gears. The cam 344 has been fastened to the gear 337 by a plurality of rivets 351 while cam 345 utilizes the bolts 304 and 305 for adequate support.

The gears 331 and 332 carry the rotatable pawls 325 and 326 respectively by means of shoulder bolts or rivets 352 and 353 respectively and each is normally biased towards engagement with the notches which have been cut into the shaft, by means of the biasing springs 354 and 355. The position of these pawls, however, is also determined by the operation of lever arms 361 and 362 which are pivotally mounted upon a shaft 363 or any other suitable rotatable mount.

As illustrated in the sectional view, Figure 19, the lever arms rest on the pawls 325 and 326 and are adjacent the gears 331 and 332. The peculiar shape of these lever arms is determined by the particular gears about which they must operate and thus the circular segments 364 have been removed from the face of the lever in order that they may provide clearance for the gear and for the pawl. The lever arms are operated about their pivot 363 by two eccentric circular disks 365 and 366 which are fixed upon a shaft 367 by means of pins 368 and 371 and the entire shaft is operable by means of a hand lever 372 which projects from the housing 31 as indicated in Figure 23.

The shaft 367 is rotatably mounted within a bearing 375 which has been formed as an integral projection of the wall of the housing and similar bearing 376 which has been drilled or reamed into a protrusion 377 of the housing wall.

Figure 21:
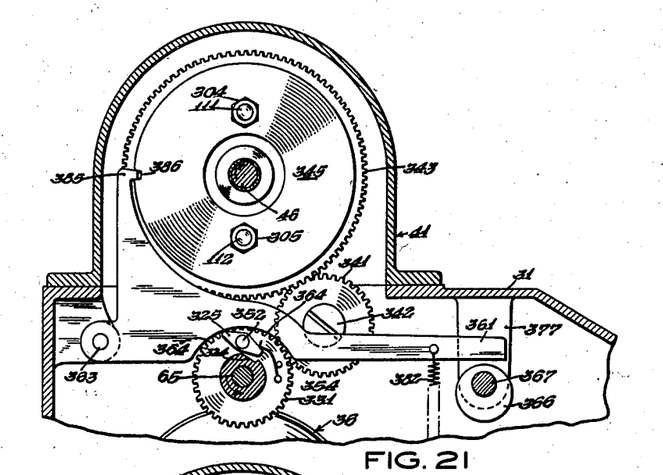
Figure 21 is an end cross-sectional view of the modified driving mechanism taken along the line 21—21 of Figure 19.

Rotation of the hand lever through 180° will therefore lift one lever and lower the other as indicated in Figure 21. The levers are biased by means of springs 381 and 382 towards their respective eccentric circular disks.

Figures 22, 23:
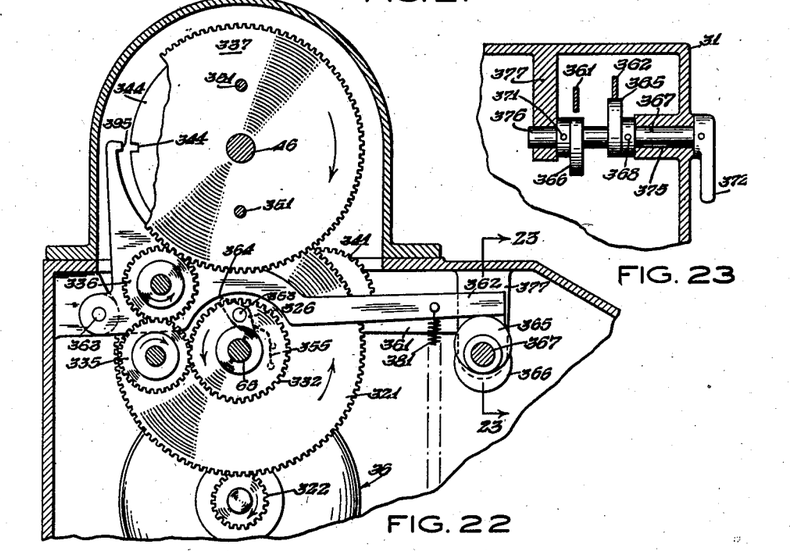
Figure 22 is an end cross-sectional view of the modified form of driving mechanism taken along the line 22—22 of Figure 19.
Figure 23 is a cross-sectional view of the modified means for switching from transmitter to receiver operation taken along the line 23—23 of Figure 22.

When the hand lever is in the position shown in Figure 23, the member 362 has been raised and thus the circular segment 364 clears the edge of the pawl 326 and allows the biasing spring 355 to force the pawl into the engageable slot 324. On the other hand, lever arm 361 as illustrated in Figure 21 has been allowed to descend under the action of its biasing spring 382 and as illustrated, the circular segment 364 has engaged the pawl 325 and rotated it against the action of the biasing spring 354 and thus the edge of the pawl clears the engageable notch 323 and will allow free rotation thereof.

In this position, therefore, the hub of the gear 321 which contains the notches 323 and 324 will engage the pawl 326 and cause rotation of the gear 332 to which the pawl has been riveted or otherwise fastened. Rotation of gear 332 through the idlers 335 and 336 will cause rotation of the gear 337 and the attached shaft 46 and if the segment of the nut 131 is in screw thread engagement with the shaft 46 corresponding axial displacement of the drum will result.

In addition, the rotation of gear 332 will drive shaft 65 and thus drive the rotatable stylus support as has been previously described. With this modification of my invention, the reverse motion of the drum due to the frictional engagement at the screw threads 127 and 131, is prevented by an additional function of the lever arm 361. That is, from Figure 21 it may be seen that the extension 385 of the lever arm 361 has engaged a notch 386 within the cam 345.

Obviously, if upon the rotation of the lever 372 to the position shown, the extension 385 does not exactly correspond with the notch 386, then the drum will rotate somewhat until these two do correspond and immediately then the spring 382 will cause engagement thereof.

With this type of driving mechanism, I need not cut the cams 54 and 103 to act as both switching members and stops for any reverse motion. Thus, as illustrated in Figure 20, the cam 391 employed to selectively separate the incoming synchronizing and picture impulses is mounted upon the gear 337 and the locking cam 344 and coaxial therewith. The notch 392 of the cam 391 is smoothly cut to ensure free cooperation with the rod 393 which operates the switching members.

When the lever arm 372 is turned from the position illustrated in Figure 23, through 180°, the position of lever arms 361 and 362 will be effectively interchanged. Thus the pawl 326 will be disengaged from its mating notch 324 in the gear hub and the pawl 325 will be allowed to effect engagement under the influence of its biasing spring 354. Also this rotation will free lever arm extension 385 from the corresponding notch 386 on the locking cam 345 and will cause the engagement of extension 395 on lever arm 362 with a cam 344 which is mounted upon the gear 337.

Fixing gear 337 relative to the frame by this engagement, through pin 341, will then preclude rotation of shaft 46. On the other hand, the engagement of pawl 325 with the notch 323 on the gear hub will result in rotation of gear 331 which because of the pawl and notch have effectively been joined. Through the idler gear 341, the power will be transmitted to gear 343 and cause a corresponding rotation of parallel guide rods 111 and 112 which have been fixed thereto. It should be noted that the direction of rotation of the drive motor must be such as to ensure cooperation between the notches in the gear hub and the corresponding pawls.

As previously described in connection with the driving mechanism of Figures 12 and 13, rotation of the parallel rods will cause rotation of the drum and if the segment of the nut 131 is in engagement with the threads 127 will also cause axial displacements thereof.

Therefore when the lever arm 372 is in the position indicated in Figure 23, the device will be in condition for the reception of facsimile signals and the recording thereof, and when displaced through 180° will be in a position for the transmission of signals corresponding with the lights and shades of a picture.

Thus in either modification of the mechanical system, by the operation of a hand lever, I may adjust my facsimile unit to either record or transmit facsimile images.

The synchronizing principle which I have illustrated although applied to a single drum recorder, may obviously be employed upon recorders of multi-stylus type if the styli themselves are mounted upon a track which is in effect endless. Thus, if I replace the chain which carries the stylus in my facsimile unit illustrated in my copending application Ser. No. 334,404 by an endless flexible chain of uniform cross section which in addition provides facilities for slidably mounting a stylus carriage, I may again secure the benefits of synchronization without undue stopping and starting of massive parts, and without the need for a second rephasing signal.

Although I have described and illustrated my invention as applied to a drum type transmitter, it will be understood by those skilled in the art that the same principles may be applied to other well-known forms of picture transmitter systems such as the oscillating type step-by-step feed shown in my Reissue Patent No. 19,575, dated May 21, 1935 or I may employ the duplex machine functions described in my application Serial No. 318,230 by adding a lamp housing with its associated system and a photoelectric cell to convert the lights and shades of a picture line into corresponding electrical variations.

I claim:

1. A duplex facsimile apparatus comprising a drum, a fixed light beam scanning member for translating the light and shades of a picture into corresponding electrical currents, said drum being rotatable and axially movable with respect to said light beam scanning member, means for transmitting said currents, a recording stylus scanning member, means for driving said recording stylus scanning member about the circumference of said drum and in a fixed plane normal to the axis of said drum, means for impressing received facsimile signals upon said stylus, means for axially displacing said drum with respect to each scanning member, and means for selectively causing the rotation of said drum when said apparatus is in operation as a transmitter, and locking said drum against rotation when said apparatus is in operation as a recorder.

2. A duplex facsimile apparatus comprising a drum, a fixed light beam scanning member for translating the lights and shades of a picture into corresponding electrical currents, means for transmitting said currents, a recording stylus scanning member, means for driving said recording stylus scanning member about the circumference of said drum and in a fixed plane normal to the axis of said drum, means for receiving facsimile picture and synchronizing signals, means for maintaining said recording stylus in synchronism with said synchronizing signals, means for axially displacing said drum with respect to each scanning member when operating said apparatus to receive pictures, means for simultaneously rotating and axially displacing said drum when operating said apparatus for the transmission of pictures, comprising a source of motive power, a threaded shaft in coaxial relation with said drum and a threaded member on said drum in releasable engagement with said threaded shaft, a cam fixed relative to said threaded shaft, means including said cam for selectively impressing said received picture signals upon said recording stylus and said synchronizing signals upon said synchronizing means when operating said apparatus for receiving pictures, and means including said cam for precluding the rotation of said threaded shaft when operating said apparatus for transmitting pictures.

3. A duplex facsimile apparatus comprising a drum, a fixed light beam scanning member operable at a distinct speed relative to said drum for translating the light and shades of a picture into corresponding electrical currents, means for transmitting said currents, a recording stylus scanning member, means for driving said recording stylus scanning member about the circumference of said drum and in a fixed plane normal to the axis of the drum at a slightly different speed relative to the speed of said light beam scanning member with respect to the drum, means whereby the over-all speed of transmitting and recording stylus scanning members relative to the drum is the same, means for receiving facsimile picture and synchronizing signals, means for supporting a sheet of sensitized material upon said drum and means impressing said received picture signals between said stylus and drum for the recording of pictures, said stylus being in juxtaposition with said sensitized material, means for supporting a picture upon said drum when operating said apparatus for the transmission of pictures, and means for releasing said recording stylus from contact with said drum.

4. A facsimile apparatus comprising a picture area, a transmitting scanning member associated therewith and operable at a first speed for translating successive unit areas of said field into picture currents varying in accordance with lights and shades of a picture to be transmitted; a receiving scanning member operable at a second speed slightly different from said first speed for translating received picture currents into corresponding lights and shades for reproduction in said picture area, means whereby the over-all speed of a complete cycle of said first and second scanning members is the same and means for selectively rendering said transmitting and said receiving scanning members operative.

5. A facsimile apparatus comprising a picture area, a transmitting scanning member associated therewith for translating successive unit areas of said field into picture currents varying in accordance with lights and shades of a picture to be transmitted; a receiving scanning member for translating received picture currents into corresponding lights and shades for reproduction in said first picture area, means for selectively rendering said transmitting and said receiving scanning members operative, means operative when said transmitting scanning member is in operation for periodically generating synchronizing pulses, means for making said receiving scanning rate slightly higher than said transmitting scanning rate and means operative when said receiving scanning member is in operation for operating in response to received synchronizing pulses to maintain said receiver in synchronism with a remote transmitter and at the same over-all cyclic speed of said first mentioned transmitter.

WILLIAM G. H. FINCH.